Nov. 10, 1964 D. C. DICKSON, JR 3,156,861

VOLTAGE REFERENCE DEVICE AND PROCESS FOR MAKING THE SAME

Filed Oct. 28, 1957 2 Sheets-Sheet 1

DONALD C. DICKSON, JR.
INVENTOR.

BY [signature]
HIS ATTORNEY

Nov. 10, 1964 D. C. DICKSON, JR 3,156,861

VOLTAGE REFERENCE DEVICE AND PROCESS FOR MAKING THE SAME

Filed Oct. 28, 1957 2 Sheets-Sheet 2

DONALD C. DICKSON, JR.
INVENTOR.

BY [signature]

HIS ATTORNEY

United States Patent Office 3,156,861

Patented Nov. 10, 1964

3,156,861

VOLTAGE REFERENCE DEVICE AND PROCESS FOR MAKING THE SAME

Donald C. Dickson, Jr., Prospect Heights, Ill., assignor to Hoffman Electronics Corporation, a corporation of California Filed Oct. 28, 1957, Ser. No. 692,708

5 Claims. (Cl. 323—66)

This invention is directed towards improved voltage reference devices and methods for making the same and, more particularly, to such devices which utilize combinations of semiconductor elements and to the method for combining these elements to obtain a desired and unusual result.

In the past when a precise reference voltage was required an electrochemical cell sometimes referred to as a standard cell was utilized. Such electrochemical cells are sensitive to temperature changes and, hence, will not provide an accurate voltage over a wide range of temperatures. Furthermore, in portable or other applications requiring reliability and light weight such standard cells have not proved satisfactory because of their bulk and inconvenience. With the advent of automatic computers, particularly those which are airborne and involved in guided missiles and the like, it has become imperative that some highly accurate voltage reference device be provided which will be free from the disadvantages of the conventional electrochemical standard cells.

Therefore, it is an object of this invention to provide a compact, light-weight and accurate voltage reference device and a method for making the same.

It is an additional object of this invention to provide a voltage reference device which is accurate to a high degree over a wide range of temperatures and to provide a method for making the same.

According to the present invention a semiconductor device, preferably a diode of silicon or germanium and having a predetermined reverse current breakdown or Zener characteristic as a function of operating temperature is combined with one or more semiconductor devices, again preferably silicon or germanium diodes, having a predetermined forward current characteristic as a function of temperature, such latter characteristic having an opposite slope to the former characteristic in order to compensate such former characteristic.

Figure 1:
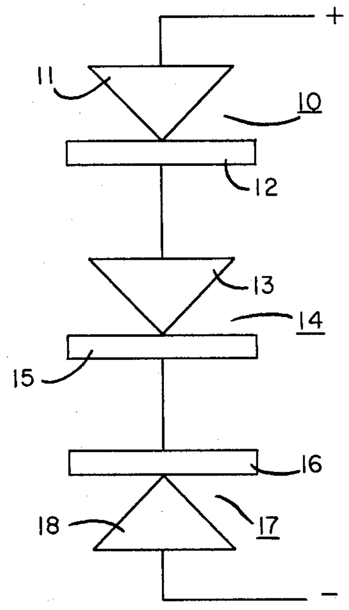

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, FIGURE 1 is a schematic diagram of one embodiment of this invention.

Figure 2:
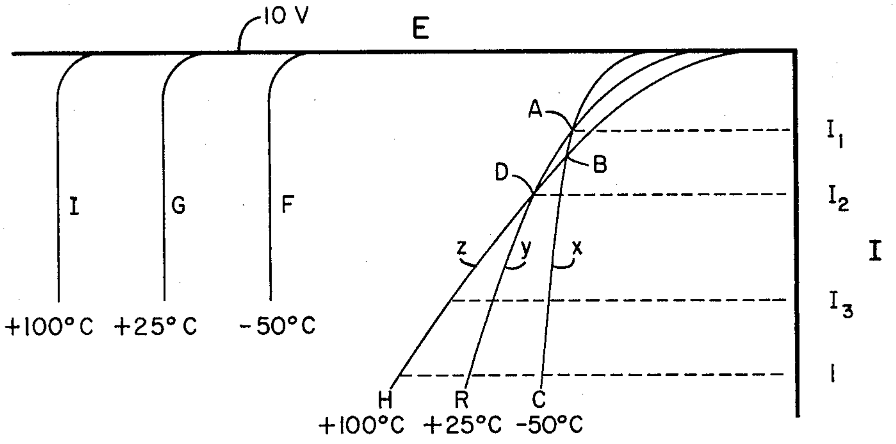

FIGURE 2. is a graphical presentation of a possible Zener characteristic of a diode to be utilized in the method and product taught by this invention.

Figure 3:
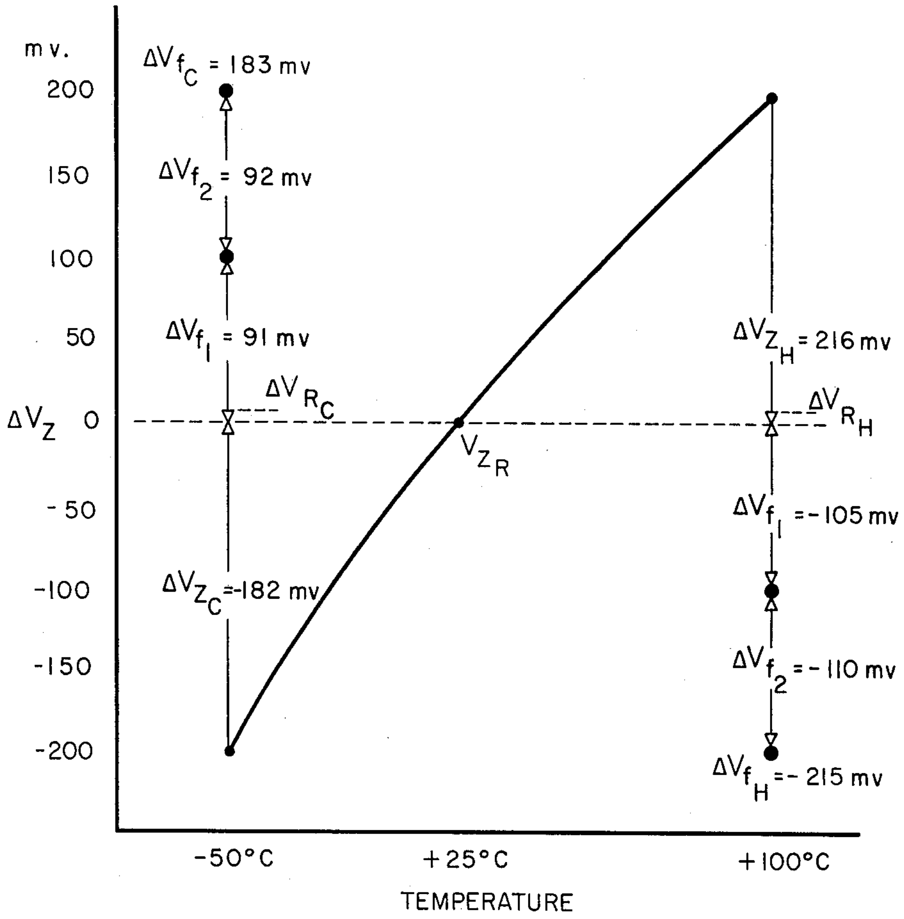

FIGURE 3. is a graphical presentation of a portion of the process or method utilized according to the present invention.

Figure 4:
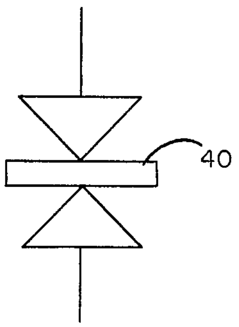

FIGURE 4. is a schematic diagram of an additional embodiment of this invention.

In FIGURE 1 diode 10 has its anode 11 adapted for the application of positive potentials thereto whereas cathode 12 is connected directly to anode 13 of second diode 14. Cathode 15 of diode 14 is connected to cathode 16 of third diode 17 the anode 18 of which is adapted for connection to the negative side of an associated circuit. With this interconnection of elements diode 10 is being operated in a forward direction as is diode 14. However, diode 17 is operating in a reverse direction.

As is well known, it is a fundamental characteristic of a unilateral conducting device such as a semiconductor diode that it should conduct electrical current in one direction with relative ease while in the opposite direction it will, within ordinary ranges of applied voltage, not conduct at all or conduct currents of extremely small magnitude in the order of microamperes. However, if the voltage applied in the reverse direction across a semiconductor diode exceeds a predetermined point known as the Zener breakdown point, relatively large magnitudes of current are conducted in the reverse direction by the diode. This phenomenon is related to the ocurrence of internal field emission which occurs when high potential fields appear across the rectifying junctions in a semiconductor diode. These high potential fields cause direct electron transitions across the forbidden zone of the semiconductor. This phenomenon has generally been considered disadvantageous because it limits the peak inverse voltage which can be tolerated by a semiconductor diode acting as a rectifier. However, according to the present invention the Zener breakdown can be utilized advantageously in voltage regulation and in voltage reference devices.

Turning to FIGURE 2 there is shown the relationship between voltage across diode 17 in the reverse direction and the current which flows through diode 17 (after the Zener breakdown point has been exceeded) with diode 17 operated at three widely differing temperatures, —50° C., +25° C., and +100° C. As can be seen by referring to FIGURE 2, the curve for —50° C. intersects the 25° C. and 100° C. curves at points A and B, respectively. In addition, the 25° C. curve intersects the 100° C. curve at point D. At currents less than $I_1$, which corresponds to point A, the voltage drop across diode 17 decreases with increasing temperature and hence the curve relating voltage drop across diode 17 to the temperature of diode 17 has a negative slope. At currents greater than $I_2$ which correspondens to point D the voltage drop in the reverse direction across diode 17 increases with increasing temperature and, hence, the curve relating voltage drop across diode 17 to the temperature of diode 17 has a positive slope.

At the same time the relationship between the forward voltage drop and temperature for a semiconductor is such that the forward voltage decreases as the temperature increases thus giving a negative slope to a curve relating forward voltage drop to temperature. For silicon the rate of change of forward voltage drop with respect to temperature is approximately —2 millivolts per degree centigrade. Thus, over a range of temperatures from —50° C. to +100° C. a change of —.3 volt in the forward voltage drop can be expected in such a silicon diode.

In general, the rate of change of the voltage drop across the Zener diode is greater than the rate of change of voltage drop across a single forward operating diode of the similar design characteristics. Furthermore, as the design of the diode is changed to require a greater reverse voltage for Zener breakdown, a larger rate of change of reverse voltage drop with respect to temperature changes can be anticipated. This is indicated by curves F, G and I in FIGURE 2.

FIGURE 3 presents graphically and purely by way of example, data obtained experimentally with an actual combination of two silicon diodes such as diodes 10 and 14 in FIGURE 1 operating in a forward direction and one Zener diode such as diode 17 in FIGURE 1 operating in a reverse direction. The reference point as far as temperature was concerned was room temperature or 25° C. A D.C. current of approximately 10 milliamperes, for example, was established in the reverse direction through a diode which was to take the position of diode 17 in FIGURE 1. The D.C. voltage drop across this Zener diode was measured at 25° C. and for the particular diode under consideration this drop was in the order of 6.8 volts. The diode was then immersed in a cold bath operating at −50° C. and after sufficient time was allowed for stabilization of the temperature of the diode, the voltage drop across the diode was measured at that temperature and with 10 milliamperes still flowing through it. In this example it was found that the drop across the Zener diode was reduced by 182 millivolts at the −50° C. temperature point. The diode was then removed from the cold bath, allowed to return to ambient and then immersed in a bath at the elevated temperature of 100° C. A measurement was made of the voltage drop across the diode at that temperature and with 10 milliamperes flowing through it. This was found to be 216 millivolts above the voltage drop at room temperature. A group of similar diodes having Zener voltages in the order of 3.5–4 volts and operating with 10 milliamperes D.C. flowing in the forward direction were then run through the same temperature cycle and two diodes corresponding to diodes 14 and 10 were chosen from the group. The first of these showed an increase in forward voltage drop of 91 millivolts at −50° C. The second of these showed an increase of 92 millivolts in the voltage drop in the forward direction making a total increase in voltage drop of 183 millivolts. At the other temperature extreme, namely 100° C., the first diode operating in a forward direction showed a decreased voltage drop of 105 millivolts while the second diode operating in a forward direction showed a decrease in voltage drop of 110 millivolts, giving a total voltage drop decrease of 215 millivolts. Thus, with the combination of two forward operating diodes 10 and 14 in series with the reverse operating Zener diode 17, the net incremental voltage drop, $\Delta V_{RC}$, across the combination as a result of dropping the temperature from +25° C. to −50° C. was only 1 millivolt and, correspondingly the net incremental voltage drop, $\Delta V_{RH}$, resulting from a change of temperature from +25° C. to 100° C. was only 1 millivolt. To all intents and purposes, the voltage drop across the combination had remained constant from −50° C to 100° C., an end which could not have been achieved with electrochemical standard voltage reference elements.

Experiments have shown that for optimum performance the dynamic impedance of the combination of diodes described in the preceding example should be not in excess of approximately 15 ohms, and for the Zener diode itself the dynamic impedance should be in the order of 6 ohms. Dynamic impedance in these cases is determined by measuring the A.C. voltage appearing across the combination or single diode, as the case may be, with 1 milliampere of A.C. current superimposed on 10 milliamperes of D.C. current flowing through the diode or combination under test.

As has been indicated with Zener devices designed to break down at higher reverse voltages, a greater rate of change of reverse voltage drop with temperature is found. On the other hand, the rate of change of forward voltage drop with temperature remains substantially constant. Thus, for Zener diodes operating at higher reverse voltages it is necessary to combine more forward operating diodes than the two which have been recited in the example. Thus, for example, if the Zener diode having the characteristics F, G and I in FIGURE 2 is operating at a Zener breakdown voltage in the order of 10 volts, a voltage change of possibly 10% or 1 volt can be expected over a range of temperatures from −50° C. to +100° C. Over the same range the change in forward voltage drop for a corresponding silicon diode would be in the order of .3 volt. In this example, therefore, it will be necessary to combine a minimum of three forward operating diodes with the single Zener diode in order to obtain a high degree of voltage drop change compensation.

If a lesser degree of compensation may be tolerated, a Zener diode operating in the range represented by curves *x*, *y* and *z* or a Zener diode represented by curves F, G and I may be compensated by a single forward operating diode. If a lower Zener voltage may be tolerated, it is possible to obtain substantially complete temperature compensation with a single forward operating diode either integral with or separate from the Zener diode. This further suggests combining the forward and reverse diodes so that a common cathode or base exists. Thus, physically, where the diode is to be one of n-type silicon, two aluminum wires may be alloyed into the common base of n-type silicon as is illustrated schematically in FIGURE 4. Control of the resistivity of the material in base 40 is required to obtain the desired Zener and forward voltage characteristics with respect to temperature.

As was noted earlier, if a Zener diode is operated below the cross-over region in the Vz v. I curve of FIGURE 2, the slope of the ΔVz v. T curve is negative. For certain applications this negative characteristic may be utilized to compensate the positive characteristic of a Zener diode operating below the cross-over region in the curve of FIGURE 2.

Thus there has been provided by the present invention a voltage reference device which has an extremely high degree of stability over wide ranges of temperature and a process for assuring the very desirable characteristics of that device.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. The process for producing a highly stable voltage reference device which includes the steps of establishing a current of predetermined magnitude through a first semiconductor device in a current range in which said semiconductor device has a voltage drop versus temperature curve which is of a first slope, measuring the voltage drop across said semiconductor device at approximately the middle and at approximately the cold and hot extremes of a range of temperatures, respectively, to give two voltage drop increment factors $\Delta V_{AC}$ and $\Delta V_{AH}$, establishing said current of predetermined magnitude through at least one additional semiconductor device, such device having a voltage drop versus temperature curve at said current of predetermined magnitude which is of an opposite slope to that of said first semiconductor device, measuring the voltage drop across each such additional semiconductor device at said approximately middle, cold and hot extremes of said range of temperatures to give voltage drop increment factors $\Delta V_{BH}$ and $\Delta V_{BC}$ for each such additional semiconductor device, selecting at least one such additional semiconductor device to give a total value $\Delta V_{BH}$ of magnitude approximating $\Delta V_{AH}$ but of opposite sign, and a total value of $\Delta V_{BC}$ of magnitude approximating $\Delta V_{AC}$ but of opposite sign, and combining in series electrical relationship said first semiconductor device and said at least one additional semiconductor device.

2. The process for producing a highly stable voltage reference device which includes the steps of establishing a Zener current of predetermined magnitude through a Zener semiconductor device, such current of predetermined magnitude lying in a current range in which said Zener semiconductor has a voltage drop versus temperature curve which is of a positive slope, measuring the voltage drop across said Zener semiconductor device at approximately the middle and at approximately the cold and hot extremes of a range of temperatures, respectively, to give two voltage drop increment factors $\Delta V_{ZC}$ and $\Delta V_{ZH}$, establishing said current of predetermined magnitude but in a forward direction through at least one additional semiconductor device, such device having a voltage drop versus temperature curve which is of a negative slope at said current of predetermined magnitude, measuring the voltage drop across each such additional semiconductor device at said approximately middle, cold and hot extremes of said range of temperatures to give voltage drop increment factors $\Delta V_{F_C}$ and $\Delta V_{F_H}$ for each such additional semiconductor device, selecting at least one such additional semiconductor device to give a total value of $\Delta V_{F_C}$ of magnitude approximating $\Delta V_{Z_C}$ but of opposite sign, and a total value of $\Delta V_{F_H}$ of magnitude approximating $\Delta V_{Z_H}$ but of opposite sign, and combining in series electrical relationship said Zener semiconductor device and said at least one additional semiconductor device.

3. The process for producing a highly stable voltage reference device which includes the steps of establishing a Zener current of predetermined magnitude through a Zener semiconductor device, such current of predetermined magnitude lying in a current range in which said Zener semiconductor has a voltage drop versus temperature curve which is of a positive slope, measuring the voltage drop across said Zener semiconductor device at approximately room temperature and at approximately the cold and hot extremes of a range of temperatures, respectively, to give two voltage drop increment factors $\Delta V_{Z_C}$ and $\Delta V_{Z_H}$, establishing said current of predetermined magnitude but in a forward direction through at least one additional semiconductor device, such device having a voltage drop versus temperature curve which is of a negative slope at said current of predetermined magnitude, measuring the voltage drop across each such additional semiconductor device at approximately room temperature, and approximately cold and hot extremes of said range of temperatures to give voltage drop increment factors $\Delta V_{F_C}$ and $\Delta V_{F_H}$ for each such additional semiconductor device, selecting at least one such additional semiconductor device to give a total value of $\Delta V_{F_C}$ of magnitude approximating $\Delta V_{Z_C}$ but of opposite sign, and a total value of $\Delta V_{F_H}$ of magnitude approximating $\Delta V_{Z_H}$ but of opposite sign, and combining in series electrical relationship said Zener semiconductor device and said at least one additional semiconductor device.

4. The process for producing a highly stable voltage reference device which includes the steps of establishing a Zener current of predetermined magnitude through a Zener semiconductor device, such current of predetermined magnitude lying in a current range in which said Zener semiconductor has a voltage drop versus temperature curve which is of a positive slope, measuring the voltage drop across said Zener semiconductor device at approximately +25° C. and at approximately −50° C. and +100° C., respectively, to give two voltage drop increment factors $\Delta V_{Z_C}$ and $\Delta V_{Z_H}$, establishing said current of predetermined magnitude but in a forward direction through at least one additional semiconductor device, such device having a voltage drop versus temperature curve which is of a negative slope at said current of predetermined magnitude, measuring the voltage drop across each such additional semiconductor device at said approximately +25° C., −50° C. and +100° C. to give voltage drop increment factors $\Delta V_{F_C}$ and $\Delta V_{F_H}$ for each such additional semiconductor device, selecting at least one such additional semiconductor device to give a total value of $\Delta V_{F_C}$ of magnitude approximating $\Delta V_{Z_C}$ but of opposite sign, and a total value of $\Delta V_{F_H}$ of magnitude approximating $\Delta V_{Z_H}$ but of opposite sign, and combining in series electrical relationship said Zener semiconductor device and said at least one additional semiconductor device.

5. The process for producing a highly stable voltage reference device which includes the steps of establishing a Zener current of predetermined magnitude through a silicon Zener device, such current of predetermined magnitude lying in a current range in which said silicon Zener device has a voltage drop versus temperature curve which is of a positive slope, measuring the voltage drop across said silicon Zener device at approximately the middle and at approximately the cold and hot extremes of a range of temperatures, respectively, to give two voltage drop increment factors $\Delta V_{Z_C}$ and $\Delta V_{Z_H}$, establishing said current of predetermined magnitude but in a forward direction through at least one additional silicon device, such device having a voltage drop versus temperature curve which is of a negative slope at said current of predetermined magnitude, measuring the voltage drop across each such additional silicon device at said approximately middle, cold and hot extremes of said range of temperatures to give voltage drop increment factors $\Delta V_{F_C}$ and $\Delta V_{F_H}$ for each such additional silicon device, selecting at least one such additional silicon device to give a total value of $\Delta V_{F_C}$ of magnitude approximating $\Delta V_{Z_C}$ but of opposite sign, and a total value of $\Delta V_{F_H}$ of magnitude approximating $\Delta V_{Z_H}$ but of opposite sign, and combining in series electrical relationship said silicon Zener device and said at least one additional silicon device.

References Cited in the file of this patent

UNITED STATES PATENTS

| | | |
|---|---|---|
| 1,930,519 | Irion | Oct. 17, 1933 |
| 2,669,004 | Blair | Feb. 16, 1954 |
| 2,712,684 | Logan | July 12, 1955 |
| 2,789,254 | Bodle et al. | Apr. 16, 1957 |
| 2,837,703 | Lidow | June 3, 1958 |
| 2,852,680 | Radcliffe | Sept. 16, 1958 |
| 2,854,651 | Kircher | Sept. 30, 1958 |
| 2,983,863 | Keonjian | May 9, 1961 |

OTHER REFERENCES

"The Suitability of the Silicon Alloy Function Diode as a Reference Standard in Regulated Metallic Rectifier Circuits," by D. H. Smith, A.I.E.E. transactions, vol. 73, part 1, January 1955 section, pages 645–651.

"Transistor Voltage Regulator," R. H. Spencer et al. A.I.E.E. Conference Paper 56–41, March 1956, pp. 16–19.

Electrical Manufacturing "Static D.-C. References for Closed-Loop Controls," M. Mamon, January 1957, pp. 54–63.